United States Patent

Maruyama et al.

[11] Patent Number: 5,930,032
[45] Date of Patent: Jul. 27, 1999

[54] UV IMAGE FORMING OPTICAL SYSTEM AND LENS FOR UV RADIATION

[75] Inventors: Koichi Maruyama; Makoto Iwaki, both of Tokyo, Japan

[73] Assignee: Asahi Kogaku Kogyo Kabushiki Kaisha, Tokyo, Japan

[21] Appl. No.: 08/577,550

[22] Filed: Dec. 22, 1995

[30] Foreign Application Priority Data

Dec. 22, 1994 [JP] Japan ................................ 6-321034
Dec. 22, 1994 [JP] Japan ................................ 6-321035

[51] Int. Cl.⁶ .............................. G02B 13/14; G02B 3/00; G02B 15/14; G02B 9/60
[52] U.S. Cl. ......................... 359/355; 359/642; 359/689; 359/769
[58] Field of Search ..................... 359/353, 354, 359/355, 356, 357, 360, 642, 689, 763, 764, 767, 769

[56] References Cited

U.S. PATENT DOCUMENTS

| | | | |
|---|---|---|---|
| 3,575,495 | 4/1971 | Tibbetts | 359/769 |
| 4,018,510 | 4/1977 | Bertele | 359/689 |
| 4,050,778 | 9/1977 | Fleischman | 359/355 |
| 5,440,442 | 8/1995 | Vollrath | 359/355 |
| 5,500,767 | 3/1996 | Maruyama et al. | 359/642 |
| 5,555,479 | 9/1996 | Nakagiri | 359/355 |

*Primary Examiner*—Cassandra C. Spyrou
*Assistant Examiner*—Audrey Chang
*Attorney, Agent, or Firm*—Greenblum & Bernstein, P.L.C.

[57] ABSTRACT

A UV image forming optical system includes a collimating lens which collimates light emitted from a UV light source, and an imaging lens which forms an image of the collimated UV light transmitted through the collimating lens. A rear focal point of the collimating lens adjacent to the imaging lens is located closer to the imaging lens than a last lens surface of the collimating lens on the light emission side. A front focal point of the imaging lens adjacent to the collimating lens is located within the imaging lens. A lens system for UV radiation is also provided, which can be used as an imaging lens for the UV image forming optical system.

17 Claims, 12 Drawing Sheets

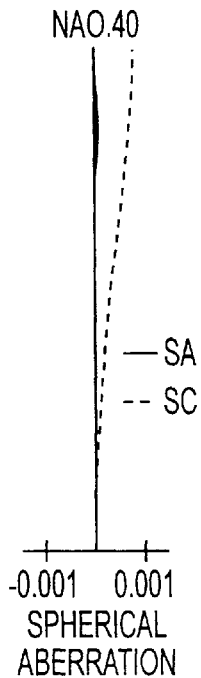
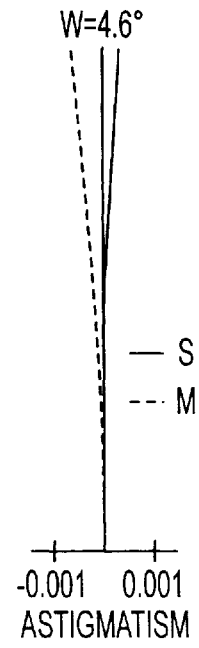
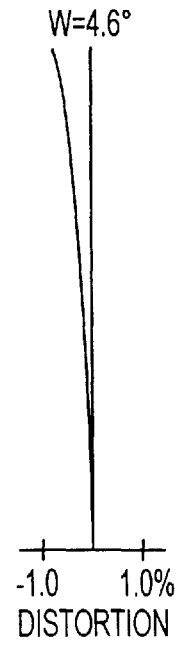
FIG. 8A      FIG. 8B      FIG. 8C
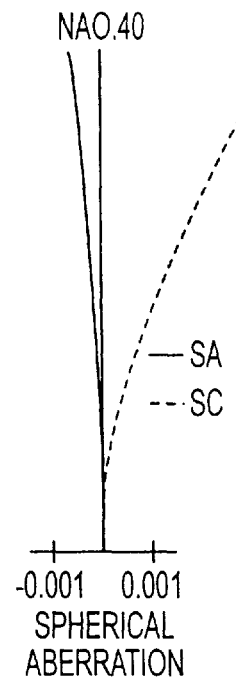
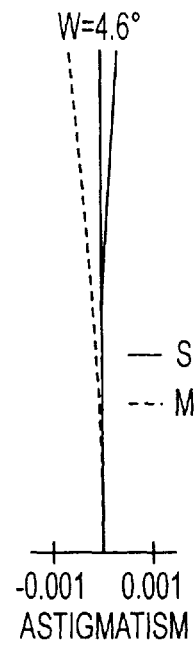
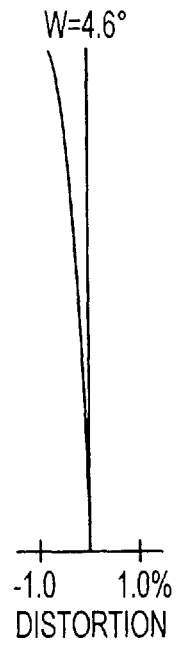
FIG. 9A      FIG. 9B      FIG. 9C

SINE CONDITION

SINE CONDITION

UV IMAGE FORMING OPTICAL SYSTEM AND LENS FOR UV RADIATION

BACKGROUND OF THE INVENTION

1. Field of the Invention

The present invention relates to an optical system and a lens for ultraviolet (UV) radiation and, more particularly, to an optical system and lens for projecting an ultraviolet ray onto a wafer to form an image of a fine pattern.

2. Description of Related Art

In an image projecting system which reduces and projects a fine pattern of an integrated circuit (IC) or a large-scale integrated circuit (LSI), etc, onto a semiconductor substrate, UV radiation such as that produced by an excimer laser has been widely used in response to a demand to shorten the wavelength of light to be used in order to increase the density of the integrated circuit.

Conventional optical glass can not be incorporated into a UV optical system since the transmittance of conventional optical glass for visible light is insufficient for UV radiation To this end, a lens made of quartz ($SiO_2$) or fluorite ($CaF_2$), which has a high UV transmittance, is usually used instead of a conventional glass lens. However, the refractive index of quartz or fluorite is lower than that of a glass lens for visible light and hence it is impossible to directly apply the same lens design for a visible region or a near UV region to a quartz or fluorite lens. To compensate aberrations, the lens for UV radiation tends to become large.

There are two major problems with a large lens. First, a focusing mechanism becomes large. It is necessary to precisely adjust the focus in order to obtain a resolution at the diffraction-limited. To adjust the focus, either the lens or the wafer is moved in the optical axis direction. A wafer moving mechanism (stepper) is provided to move the wafer in a direction perpendicular to the optical axis. If the lens becomes large, then it is necessary to provide a large and complicated moving mechanism for the lens or wafer.

Secondly, it is difficult to evaluate the optical performance of the lens. In a UV projecting optical system which is aimed to form an image with a resolution at the diffraction-limited, the amount of aberrations remaining in the optical system must be decreased in proportion to the wavelength. To this end, it is necessary to enhance the production and precision of the lens for UV radiation, and also the lens should be adjustable to improve precision. This is far more important for a lens for UV radiation, than a glass lens for visible light. In particular, if a highly precise adjustment can be carried out, the level of production and precision would be reduced to some extent, thus facilitating the production of UV lenses.

In a lens which is adapted to form an image of a fine pattern, for example, in optical lithography, that is, in a lens which projects a micro pattern of an IC or LSI having a reduced size, it is desirable to use an image forming optical system having a light source with short wavelength, since the size of the smallest spot image which can be resolved is in proportion to the wavelength.

It is necessary to minimize the Petzval sum as much as possible in order to restrict the curvature of field. The Petzval sum P is represented by $P=\Sigma\phi/n$, wherein "$\phi$" designates the power of each lens surface, and "n" the refractive index of each lens, respectively. In view of this relation, in conventional lenses for visible light, the curvature of field is corrected by a combination of glasses having different refractive indexes. However, since the material of which a UV lens is made is practically limited to vitreous silica or quartz ($SiO_2$), or fluorite ($CaF_2$), the above-mentioned solution can not be applied to UV lenses. In general, the transmittance of optical glass dramatically decreases in the UV region, and this decrease occurs more remarkably as the refractive index increases.

At the short wavelength, below about 300 nm, the material of the lens which can be used is limited to only $SiO_2$ or $CaF_2$. However, since fluorite is soft and hard to shape, in practice, the optical material available for the lens is limited to only vitreous silica or quartz. This limitation makes it impossible to eliminate the aberrations by a combination of lens materials having different refractive indexes. Consequently, it is fundamentally difficult to restrict the Petzval sum or a spherical aberration

SUMMARY OF THE INVENTION

The primary object of the present invention is to provide a small UV image forming optical system in which focusing can be carried out by only moving a part of the lens system and, hence, the focusing mechanism can be made small.

Another object of the present invention is to provide a UV image forming optical system in which the optical property of a lens can be simply evaluated without the need for a special measuring system.

Still another object of the present invention is to provide a bright lens for UV radiation, whose material is practically limited to vitreous silica or quartz, in which the aberrations including, the curvature of field, can be effectively compensated for at an enhanced diffraction-limited.

According to an aspect of the present invention, there is provided a UV image forming optical system comprising a collimating lens which collimates light emitted from a UV light source, and an imaging lens which forms an image of the collimated UV light transmitted through the collimating lens, wherein a rear focal point of the collimating lens, adjacent to the imaging lens, is located closer to the imaging lens than a last lens surface of the collimating lens on the emission side, and a front focal point of the imaging lens, adjacent to the collimating lens, is located within the imaging lens.

The following formulae (1), (2) and (3) specify the preferable positions of the focal points of the respective lenses in a UV image forming optical system which is comprised of a collimating lens and an imaging lens:

$$d1/f1<1.0 \quad (1)$$

$$2.50<d1/f2 \quad (2)$$

$$1.50<d2/f2<5.0 \quad (3)$$

wherein, d1 represents the distance between the last lens surface of the collimating lens and the rear focal point thereof adjacent to the imaging lens;

d2 represents the distance between the first lens surface of the imaging lens, adjacent to the collimating lens, and the front focal point of the imaging lens;

f1 represents the focal length of the collimating lens; and, f2 represents the focal length of the imaging lens.

According to another aspect of the present invention, there is provided a lens system for UV radiation, comprising:

a negative first lens group, a positive second lens group, and a positive third lens group having at least one negative lens element, in this order from the light incident side, and wherein the following relationships defined by formulae (4), (5) and (6) below are satisfied:

$$1.0 < d4/f \quad (4)$$

$$6.0 < d2/f < 20.0 \quad (5)$$

$$-6.0 < f2/f1 < -3.3 \quad (6)$$

wherein, f represents the focal length of the whole optical system;

d4 represents the distance between the second lens group and the third lens group;

d2 represents the distance between the first lens group and the second lens group;

f1 represents the focal length of the first lens group; and, f2 represents the focal length of the second lens group.

The negative first lens group can be comprised of a single negative lens and the positive second lens group can be comprised of a single positive lens.

The third lens group can be comprised of three positive lens elements, a negative lens element, and a further positive lens element, in this order from the light incident side. Alternatively, the third lens group may comprise two positive lens elements, a negative lens element, and a further two positive lens elements, in this order from the light incident side.

Preferably, a lens barrel supporting mechanism which supports the first lens group and the second lens group comprises an adjusting mechanism which adjusts the distance between the first lens group and the second lens group upon assembly, to correct the comatic aberration.

The UV lens, for UV radiation at a wavelength below 350 nm, can be used as an image forming lens in a UV image forming optical system comprised of a collimating lens and an imaging lens.

The present disclosure relates to subject matter contained in Japanese Patent Application Nos. 6-321034 (filed on Dec. 22, 1994) and 6-321035 (filed on Dec. 22, 1994) which are expressly incorporated herein by reference in their entirety.

BRIEF DESCRIPTION OF THE DRAWINGS

The invention will be described below in detail with reference to the accompanying drawings, in which:

FIG. 8 shows diagrams of aberrations of the lens system shown in FIG. 7;

FIG. 9 shows diagrams of aberrations when the distance between a first lens group and a second lens group is changed from 71.450 to 71.650 in the lens system shown in FIG. 7;

DESCRIPTION OF THE PREFERRED EMBODIMENT

Figure 1:
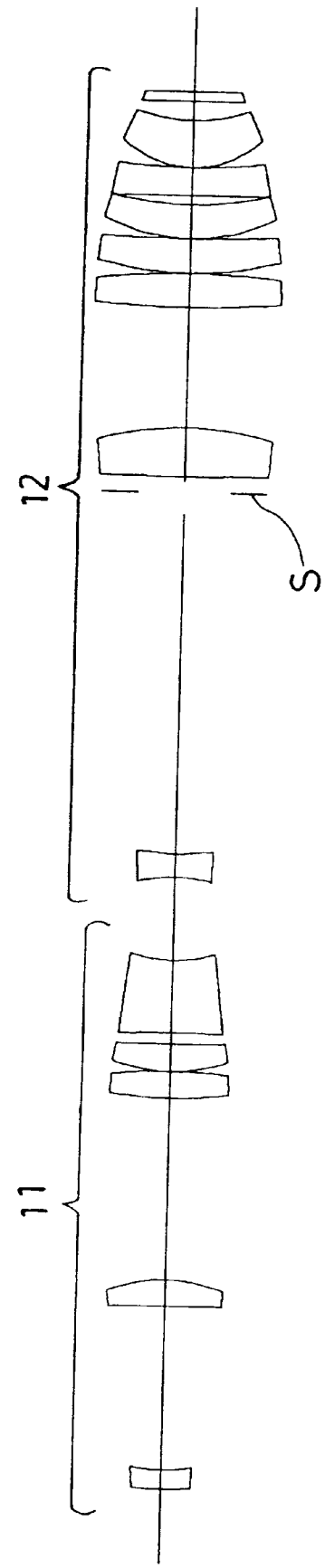
FIG. 1 is a schematic view showing a lens arrangement of a UV image forming optical system, according to a first embodiment of the present invention.

A UV image forming optical system is comprised of two lenses, i.e., a collimating lens and an imaging lens. The rays of light are parallel between the collimating lens and the imaging lens. In an optical system in which two lenses are separated from each other in the region in which the rays of light are parallel, no change in magnification occurs when only the imaging lens is moved upon focusing. In this embodiment, the aberrations of not only the collimating lens, which emits collimated light, but also the imaging lens, which receives the collimated light, are corrected such that optimal efficiency is obtained when the parallel rays of light are made incident at an infinite object distance. Consequently, aberrations are not affected when the imaging lens moves Since focusing can be carried out by the movement of the imaging lens only, the focusing mechanism can be simplified. Since each focal point of the collimating lens and the imaging lens are set such that the lenses define a double telecentric lens system, no change in magnification takes place even when the exposure surface is slightly uneven Depending on the usage of the stepper, one of the most significant factors is the stability of the image magnification, i.e., no change in magnification during focusing or due to the slightly stepped portion of the exposure surface.

The UV image forming optical system has the function to reduce the size of an image (reduce magnification). Consequently, the collimating lens which collimates the light emitted from the UV light source has a relatively small NA (numerical aperture) and a large image circle; and, the imaging lens whose angle of view is the same as that of the collimating lens has a relatively larger NA and a smaller image circle, compared with the collimating lens. Hence, the remaining wavefront aberrations from the collimating lens and the imaging lens can be easily and precisely measured by using an interferometer, upon which the collimated light is made incident. Generally speaking, it is necessary to provide an interferometer inherent to the associated optical system, in order to evaluate the optical performance of the lens whose aberration is not corrected with respect to the collimated light. A general purpose interferometer can be used to measure the optical performance of a lens whose aberration has been corrected with respect to the collimated light. Since the collimated light is made incident upon the collimating lens and the imaging lens in this embodiment, a conventional or general purpose interferometer can be used to measure the optical performance (optical property) of the lenses, so that the aberration correction or the adjustment of positional deviation can be effected in accordance with the measured optical performance. Namely, the UV image forming optical system can be used or the adjustment of which can be carried out while easily monitoring the optical performance thereof by using a general purpose interferometer.

The resolving power of a lens system is determined in accordance with an effective NA of the lens system. Therefore, it is necessary to prevent the quantity of light at the peripheral portion of the lens system from decreasing due to an inconsistency of the pupils in order to establish a uniform optical performance at the center and peripheral portion of the lens. In a UV image forming optical system having a reduction magnification, the collimating lens has a small NA and exhibits a small image circle and the imaging lens has a relatively large NA and exhibits a large image circle, and hence, the imaging lens having a large NA tends to include an increased number of lenses (lens elements) and to be long in the optical axis direction. Consequently, if the entrance pupil of the imaging lens is located outside the lens, the lens diameter is too large to have a sufficient thickness at the peripheral edge of the lens.

To solve this, in this embodiment, the imaging lens is of an inverted telescopic type (retrofocus type) in which the front focal point is located within the lens, and the collimating lens is of a type in which the rear focal point is located out of the lens, to thereby form a telecentric optical system in which no change in magnification takes place in use.

The above-noted formula (1) limits the whole lens length of the UV image forming optical system. If the value of the ratio is above the upper limit defined in the formula (1), the whole length of the retrofocus lens is too long.

The above-noted formula (2) specifies the requirement to make the pupils of the collimating lens and the imaging lens coincidental with each other If the value of the ratio is below the lower limit defined in the formula (2), it is difficult to make the pupil of the collimating lens coincidental with the pupil of the imaging lens.

The above-noted formula (3) defines the requirements to correct the curvature of field and make the pupils of the collimating lens and the imaging lens coincidental with each other. If the value of the ratio is below the lower limit defined in the formula (3), it is impossible to completely correct the curvature of field of the imaging lens. Conversely, if the value of the ratio is above the upper limit, it is difficult to make the pupil of the collimating lens coincidental with the pupil of the imaging lens.

Three embodiments of a UV image forming optical system will be discussed below with reference to Tables 1 through 3 and FIGS. 1–6. In the first, second and third embodiments below, the optical system is comprised of a collimating lens 11 and an imaging lens 12. A diaphragm S is located within the imaging lens 12. Depending on the usage of the stepper, a UV light source, an illuminating light source, and a reticle (pattern to be reduced and projected) to be illuminated with the UV radiation are located on the left side of the lens system in the drawings; and a wafer (photosensitive medium) on which the reduced image of the reticle is to be projected is located on the right side of the lens system in the drawings.

In the following tables and drawings, "NA" designates the numerical aperture; "M" the lateral magnification; "$f_B$" the back focal distance, "R" the radius of curvature of each lens surface, "D" the lens thickness or the distance between the lenses, and "N (266 nm)" and "N (248 nm)" the refractive indexes at the wavelengths of 266 nm and 248 nm, respectively. Further, for the values listed in each of the Tables 1–3, the lens surfaces and distances are numbered consecutively from the lefthand side to the righthand side in FIGS. 1, 3 and 5, respectively.

Figure 2A:
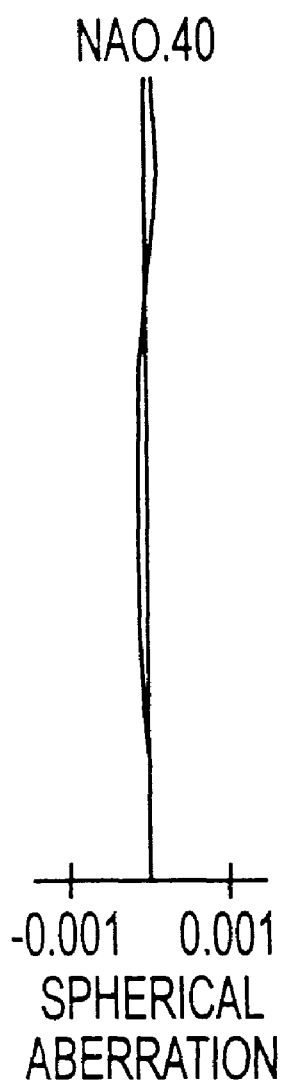
FIG. 2 shows diagrams of aberrations of the lens system shown in FIG. 1.
Figure 2B:
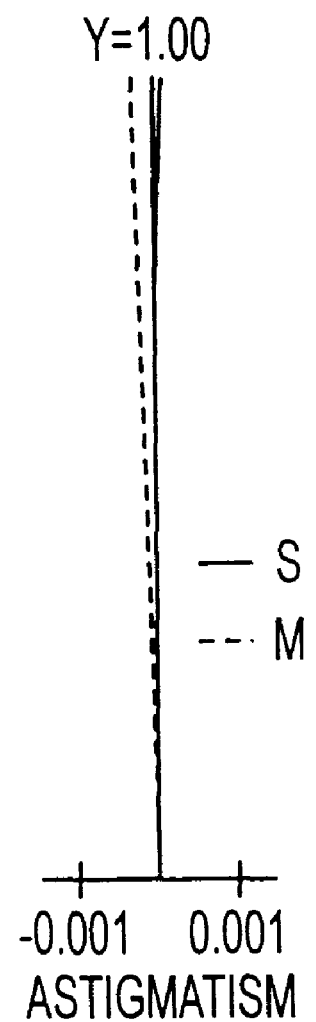
Figure 2C:
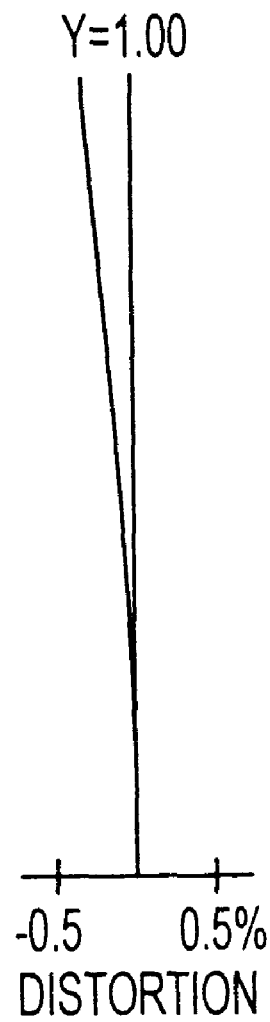

1st Embodiment:

In the first embodiment, the collimating lens 11 is comprised of five lenses and, the imaging lens 12 is comprised of eight lenses. The lens arrangement and lens data of the first embodiment are shown in FIG. 1 and Table 1, and the aberrations of the lens system are shown in FIG. 2.

TABLE 1

NA = 0.40
M = −0.200
$f_B$ = 22.47

| Surface No. | R | D | N(266 nm) |
|---|---|---|---|
| 1 | 139.983 | 4.900 | 1.49967 |
| 2 | 32.075 | 43.550 | — |
| 3 | −703.853 | 7.000 | 1.49967 |
| 4 | −43.240 | 48.340 | — |
| 5 | 119.303 | 7.000 | 1.49967 |
| 6 | −141.034 | 0.210 | — |
| 7 | 51.071 | 7.000 | 1.49967 |
| 8 | 325.573 | 3.000 | — |
| 9 | −366.108 | 19.260 | 1.49967 |
| 10 | 37.034 | 22.000 | — |
| 11 | −33.912 | 6.000 | 1.49967 |
| 12 | 52.000 | 95.520 | — |
| Stop | ∞ | 4.300 | — |
| 13 | 3000.000 | 12.880 | 1.49967 |
| 14 | −88.800 | 31.810 | — |
| 15 | 275.000 | 9.000 | 1.49967 |
| 16 | −193.485 | 0.100 | — |
| 17 | 92.741 | 9.000 | 1.49967 |
| 18 | 485.000 | 0.100 | — |
| 19 | 50.501 | 9.000 | 1.49967 |
| 20 | 96.650 | 2.200 | — |
| 21 | 1520.979 | 7.400 | 1.49967 |
| 22 | 130.320 | 0.100 | — |
| 23 | 26.525 | 12.500 | 1.49967 |
| 24 | 46.311 | 5.000 | — |
| 25 | ∞ | 2.535 | 1.49967 |
| 26 | ∞ | — | — | d1: 51.994
d2: 30.011
f1: 70.001
f2: 14.029

Figure 3:
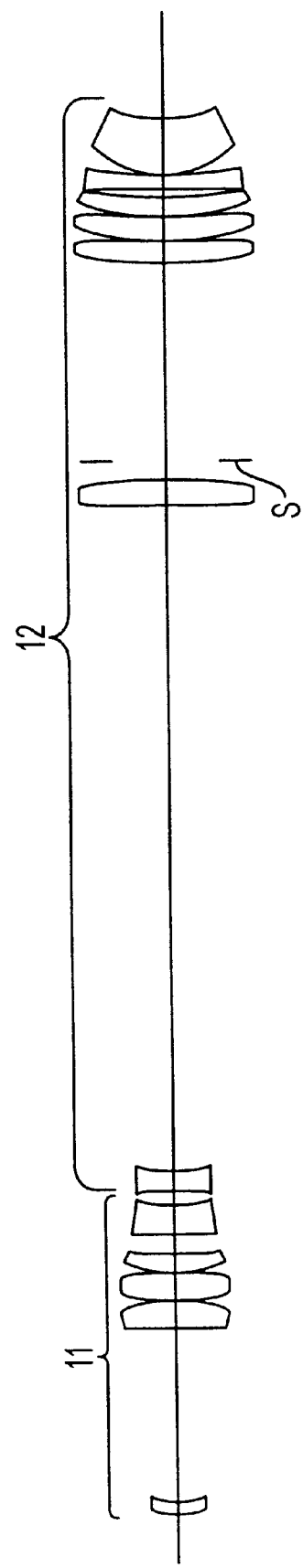
FIG. 3 is a schematic view showing a lens arrangement of a UV image forming optical system, according to a second embodiment of the present invention.
Figure 4A:
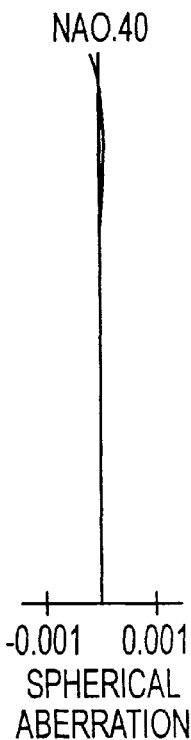
FIG. 4 shows diagrams of aberrations of the lens system shown in FIG. 3.
Figure 4B:
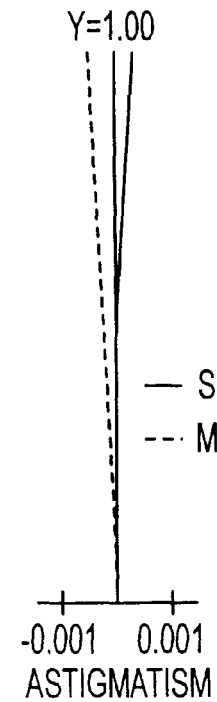
Figure 4C:
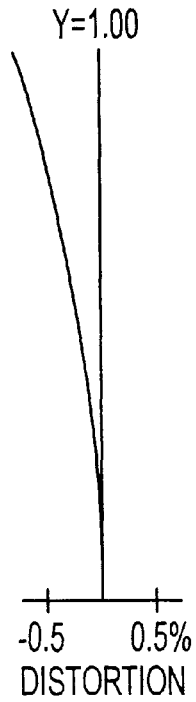

2nd Embodiment:

In the second embodiment, the collimating lens 11 is comprised of five lenses, and the imaging lens 12 is comprised of seven lenses. The lens arrangement and lens data of the optical system of the second embodiment are shown in FIG. 3 and Table 2, and the aberrations of the optical system shown in FIG. 3 are shown in FIG. 4.

TABLE 2

NA = 0.40
M = −0.200
$f_B$ = 28.83

| Surface No. | R | D | N(248 nm) |
|---|---|---|---|
| 1 | 35.796 | 3.500 | 1.50841 |
| 2 | 20.078 | 46.060 | — |
| 3 | −4113.479 | 7.500 | 1.50841 |
| 4 | −39.721 | 0.100 | — |
| 5 | 75.025 | 7.500 | 1.50841 |
| 6 | −146.490 | 0.100 | — |
| 7 | 33.802 | 5.000 | 1.50841 |

TABLE 2-continued

NA = 0.40
M = −0.200
$f_B$ = 28.83

| Surface No. | R | D | N(248 nm) |
|---|---|---|---|
| 8 | 117.991 | 5.620 | — |
| 9 | −307.680 | 7.500 | 1.50841 |
| 10 | 24.415 | 4.400 | — |
| 11 | −65.427 | 5.000 | 1.50841 |
| 12 | 34.431 | 180.000 | — |
| 13 | 411.480 | 7.000 | 1.50841 |
| 14 | −159.495 | 4.960 | — |
| Stop | ∞ | 53.300 | — |
| 15 | 153.354 | 6.000 | 1.50841 |
| 16 | −532.041 | 0.080 | — |
| 17 | 71.588 | 6.000 | 1.50841 |
| 18 | 218.181 | 0.080 | — |
| 19 | 55.151 | 6.000 | 1.50841 |
| 20 | 100.751 | 1.600 | — |
| 21 | 382.767 | 4.000 | 1.50841 |
| 22 | 130.227 | 0.080 | — |
| 23 | 27.349 | 14.700 | 1.50841 |
| 24 | 38.836 | — | — | d1: 42.041
d2: 37.653
f1: 49.970
f2: 10.000

Figure 6A:
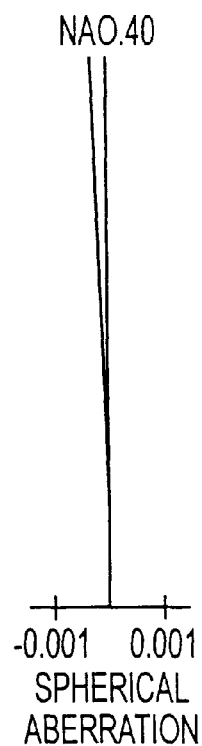
FIG. 6 shows diagrams of aberrations of the lens system shown in FIG. 5.
Figure 6B:
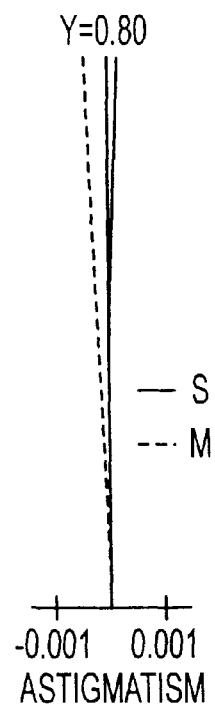
Figure 6C:
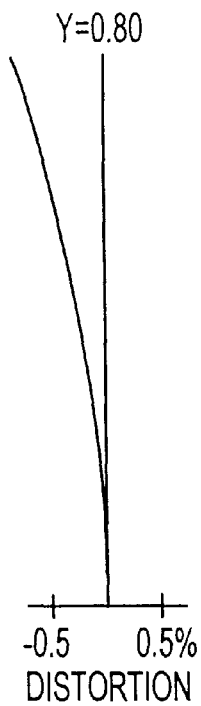
Figure 5:
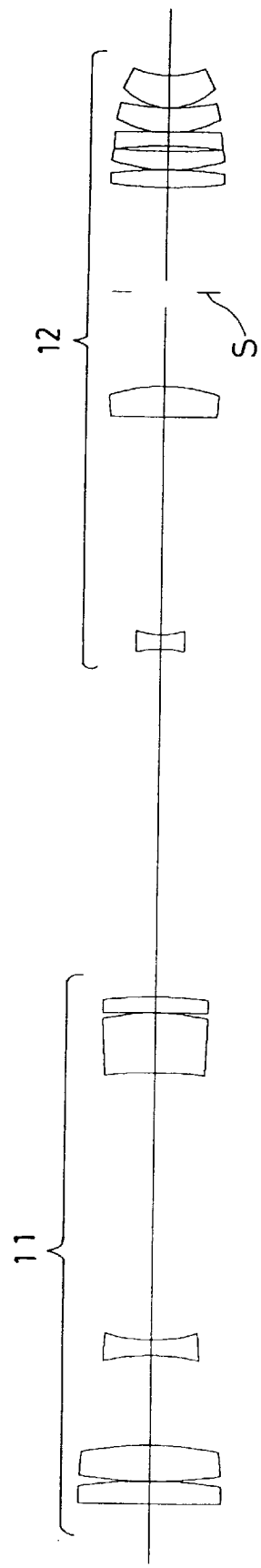
FIG. 5 is a schematic view showing a lens arrangement of a UV image forming optical system, according to a third embodiment of the present invention.

3rd Embodiment:

In the third embodiment, the collimating lens 11 is comprised of five lenses, and the imaging lens 12 is comprised of seven lenses. The lens arrangement and lens data of the optical system of the third embodiment are shown in FIG. 5 and Table 3, and the aberrations of the optical system shown in FIG. 5 are shown in FIG. 6.

TABLE 3

NA = 0.40
f = 66292.77
M = −0.040
$f_B$ = 21.83

| Surface No. | R | D | N(266 nm) |
|---|---|---|---|
| 1 | 1803.004 | 7.680 | 1.49967 |
| 2 | −143.032 | 0.130 | — |
| 3 | 175.827 | 11.730 | 1.49967 |
| 4 | −109.073 | 29.580 | — |
| 5 | −76.052 | 5.000 | 1.49967 |
| 6 | 48.282 | 87.680 | — |
| 7 | −134.477 | 19.650 | 1.49967 |
| 8 | −74.127 | 0.120 | — |
| 9 | −767.980 | 5.000 | 1.49967 |
| 10 | −141.515 | 114.300 | — |
| 11 | −33.191 | 4.510 | 1.49967 |
| 12 | 25.614 | 71.510 | — |
| 13 | −11921.599 | 9.720 | 1.49967 |
| 14 | −58.313 | 31.000 | — |
| Stop | ∞ | 34.400 | — |
| 15 | 143.291 | 5.720 | 1.49967 |
| 16 | −159.364 | 0.050 | — |
| 17 | 62.849 | 6.140 | 1.49967 |
| 18 | 234.248 | 1.710 | — |
| 19 | −150.243 | 4.310 | 1.49967 |
| 20 | 562.003 | 0.050 | — |
| 21 | 37.079 | 8.000 | 1.49967 |
| 22 | 81.099 | 0.050 | — |
| 23 | 20.943 | 10.500 | 1.49967 |
| 24 | 31.265 | — | — | d1: 138.884
d2: 24.547
f1: 250.000
f2: 10.005

Numerical values of the above-noted formulae (1) through (3) corresponding to the three embodiments are shown in Table 4 below.

TABLE 4

|  | Formula(1) | Formula(2) | Formula(3) |
|---|---|---|---|
| Embodiment 1 | 0.743 | 3.706 | 2.139 |
| Embodiment 2 | 0.841 | 4.204 | 3.765 |
| Embodiment 3 | 0.556 | 13.881 | 2.453 |

As can be seen from Table 4, the first, second and third embodiments meet the requirements defined in the formulae (1) through (3), and the aberrations are effectively compensated for in the three embodiments.

As may be understood from the above discussion, according to the present invention, since focusing can be carried out by moving only a part of the lens system, i.e., the imaging lens, the focusing mechanism can be made small and simplified Moreover, the lens performance can be easily evaluated without additionally providing a special measuring system.

The following discussion will be directed to a UV lens system which can be used as an image forming lens in a UV image forming optical system as mentioned above.

A UV lens system is comprised of a negative first lens group, a positive second lens group and a positive third lens group having at least one negative lens, arranged in this order from the light incident side.

If a lens is made of a material having a low refractive index (n), the above-mentioned Petzval sum P (=Σ100/n) tends to be a large value, so that the image surface is curved in the under (i.e. negative) direction. In case of a UV lens, it is impossible to optionally select the refractive index, due to the material from which the UV lens is made, as mentioned above. Consequently, in order to reduce the value of Petzval sum P, it is necessary to increase the power of the negative lens to thereby decrease the difference in the power between the negative lens and the positive lens. The resultant power $\phi$ of the lens is given by $\phi=\Sigma h_i\phi_i$, wherein "$h_i$" represents the height of the incident point on the i-th lens surface, at which the paraxial marginal rays incident upon the first lens surface at the height $h_i=1$ is made incident upon the i-th lens surface, and $\phi_i$ represents the power of the i-th lens surface, respectively.

If a lens having a strong negative power is used, it is desirable that the negative lens is located at a small height "h" so as to obtain a sufficient resultant power. In general, a lens system can be more conveniently used, as the distance between the last lens and the image forming surface increases, i.e., the back focal distance increases. Namely, a so-called retrofocus type is advantageous.

Taking into account these circumstances, the negative first lens group is adapted to diverge the collimated light; the positive second lens group is adapted to collimate the diverged light; and, the positive third lens group is adapted to converge the collimated light. With this arrangement, a flat image surface can be easily realized owing to the correction of the curvature of field by the concave lens of the first lens group.

Both the second and third lens groups have positive power. In other words, the positive lens group located behind the negative first lens group is split into two positive lens groups (second and third lens groups), and the second and third lens groups are spaced so as to satisfy the relationship defined by the above-noted formula (4), to thereby effectively correct aberrations, particularly astigmatism If the distance between the second and third lens groups is smaller than the lower limit defined in the formula (4), no astigmatism can be correctly compensated for and it is difficult to enlarge the image circle.

If the third lens group is comprised of positive lens groups only, a sufficient working distance (distance between the last lens surface and the image forming surface, in an optical system to converge and form an image of collimated light) can be easily obtained, but the correction of the spherical aberration must be effected only by the negative lens(es) of the first lens group. If the correction of the spherical aberration is carried out only by the negative lens(es) of the first lens group, a high-order spherical aberration cannot be eliminated, so that no lens having a large NA can be produced. Since the resolving power is proportional to the NA, a lens whose NA is small is almost useless even if it can be used at a short wavelength.

In order to realize a wide angle lens, it is preferable that a lens group other than the first lens group include a negative lens. However, if the second lens group includes a negative lens, and if the negative lens has a power strong enough to effectively correct the curvature of field, the power of the whole lens system becomes small, since the height $h_i$ of the second lens group is large. Consequently, it is necessary to use a thick meniscus lens which has an enhanced divergent surface and a weak power. However, the use of such a meniscus lens is not advisable because a strict dimensional tolerance is needed.

To solve this problem, the negative lens is incorporated in the third lens group. The incorporation of the negative lens in the third lens group tends to invite a reduction of the back focal distance. The above-noted formulae (5) and (6) specify the focal lengths of the first and second lens groups and the distance therebetween to respond to the requirement of an incorporation of the negative lens in the third lens group without reducing the back focal distance.

If the value of ratio defined in the formula (5) is below the lower limit, i.e., if the distance between the first and second lens groups is too small, the power of the negative lens and the positive lens must be increased This causes a high-order spherical aberration, thus resulting in no production of a lens having a large NA.

Conversely, if the lens diameter is increased so as to receive the light at the peripheral edge of the lens, to thereby prevent an eclipse (vignetting) of light within the effective angle of view, a uniform resolving power is obtained over the entirety of the lens including the peripheral edge in an optical lens system which projects a fine pattern as in the present invention. If the lens distance is larger than the upper limit defined in the formula (5), it is difficult to obtain a sufficient thickness of the lens at the peripheral edge thereof or it is impossible to increase the angle of view due to the high-order aberrations.

If the power of the negative first lens group is strong so that the ratio defined in the formula (6) is below the lower limit, it is impossible to produce a lens having a large NA due to the high-order aberration caused in the negative lens. Conversely, if the ratio defined in the formula (6) is above the upper limit, it is impossible to effectively correct the Petzval sum.

If the optical system meets all the requirements defined by the above-noted formulae (4), (5) and (6), the negative first lens group and the positive second lens group can be each comprised of a single lens to obtain an optimum optical property.

If the last lens of the third lens group is made of a negative lens, the curvature of field can be effectively corrected, but, on the other hand, the variation of the spherical aberration becomes large due to an error of the lens thickness or the distance between the lenses, caused upon manufacturing, or the radius of curvature is so small that the off-axis performance deteriorates Accordingly, the negative lens in the third lens group is preferably located in front of the last lens (positive lens). It should be recalled that in practice, the UV lens would have to be made of vitreous silica or quartz whose refractive index is low. In such a UV lens in which the negative lens is contained in the third lens group, it is necessary to incorporate at least four positive lenses in order to obtain a sufficient power without causing excess spherical aberrations To this end, the third lens group is preferably comprised of five lenses consisting of a positive first lens element, a positive second lens element, a positive third lens element, a negative fourth lens element and a positive fifth lens element. Alternatively, a positive first lens element, a positive second lens element, a negative third lens element, a positive fourth lens element and a positive fifth lens element, in this order from the light incident side, may be utilized. From the viewpoint of an enhancement of the NA, it is preferable that there are more than four positive lens elements in the third lens group. Nevertheless, the number of positive lens elements in the third lens group is preferably five, because if there are five or more positive lens elements, each having an appropriate thickness to obtain a sufficient surface precision, in the third lens group (i.e., if the third lens group includes six or more lens elements in total), the size of the whole lens system becomes unnecessarily large.

Preferably, an adjusting mechanism is provided to adjust the distance between the first lens group and the second lens group to thereby correct comatic aberration. When the distance between the first and second lens groups varies, the relative height of an incident point of the off-axis light is varied, so that the state of the comatic aberration can be modified. Thus, the comatic aberration caused due to a manufacturing error can be corrected by the adjustment of the distance between the first and second lens groups.

Figure 16:
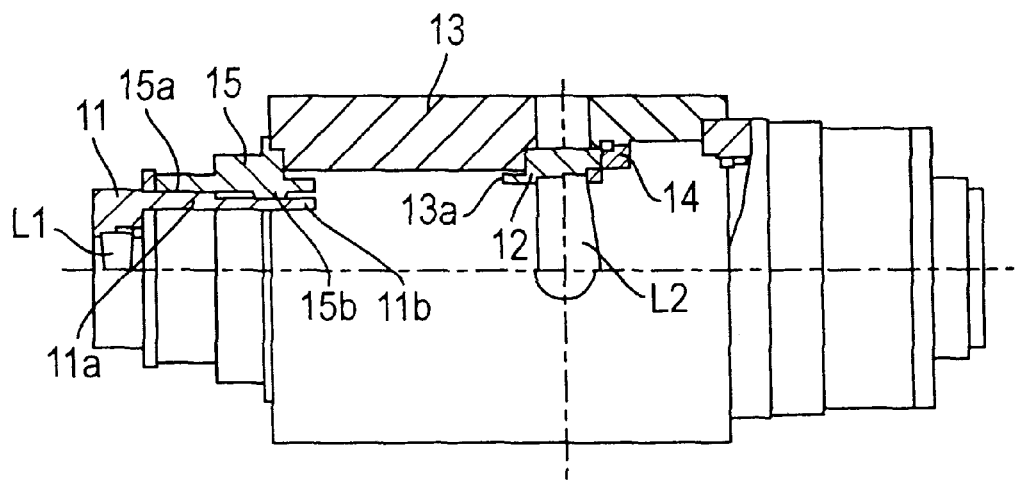
FIG. 16 is a sectional view of an upper half of an adjusting mechanism which varies the distance between a first lens group and a second lens group.

An embodiment of an adjusting mechanism which adjusts the distance between the first lens group and the second lens group is shown in FIG. 16.

The first lens group L1 is comprised of a single negative lens which is secured to a front end of a cylindrical lens holder 11. The lens holder 11 is provided on the outer peripheral surface thereof with a finely threaded portion (male screw) 11a and a cylindrical sliding portion 11b. The second lens group L2 is comprised of a single positive lens which is secured to a lens holding ring 12. The lens holding ring 12 is fitted in a large diameter barrel 13 which is provided on the inner peripheral surface thereof with a stepped portion 13a against which the lens holding ring 12 abuts through an annular retainer 14 at a predetermined position. A supporting cylinder 15 is integrally secured to the front end of the large diameter barrel 13. The supporting cylinder 15 is provided on the inner peripheral surface thereof with a finely threaded portion (female screw) 15a which is screw-engaged by the male screw 11a of the lens holder 11, and a flange 15b which comes into sliding contact with the sliding portion 11b of the lens holder 11 to prevent the lens holder 11 from being inclined with respect to the supporting cylinder 15 during the sliding movement. The third lens group which is to be connected to the right end of the large diameter barrel 13 is not shown in FIG. 16.

With this arrangement, when the lens holder 11 rotates, the distance between the first lens group L1 and the second lens group L2 is varied, so that the comatic aberration of the whole lens system can be corrected or adjusted. Preferably, the length of the engaging portion between the lens holder 11 and the supporting cylinder 15 is as long as possible to prevent the first lens group L1 from being inclined during the rotation of the lens holder 11 to thereby prevent an occurrence of the comatic aberration due to the off-centered nature of the first lens group L1.

It is possible to provide a parallel-plane plate behind the third lens group to adjust the spherical aberration. The thickness of the parallel-plane plate can be appropriately selected to correct the spherical aberration in order to produce a lens having a large NA.

As mentioned above, parallel rays are incident upon the UV lens. In the case that the UV lens is used to produce an IC or LSI, etch, rays of UV light transmitted through a reticle (fine pattern) are collimated by the collimating lens group and are then made incident upon the UV lens to form an image of the fine pattern onto the wafer (photosensitive medium). Images of the reticle are repeatedly exposed on the wafer at different positions thereof. In this optical system, it is very important that the image magnification remains stable, which would be otherwise varied due to the finely stepped portion (irregularity) of the exposure surface or varied during focusing. In the UV image forming optical system which is comprised of two lens groups of the collimating lens group and the imaging lens group according to the present invention, focusing can be carried out by the movement of the imaging lens group only, and no change of magnification occurs during focusing.

Four further examples (fourth, fifth, sixth and seventh embodiments herein) of the UV lens according to the present invention will be discussed below with reference to Tables 5 through 8 and FIGS. 7–15. The UV imaging lens of the 4th–7th embodiments can be used as the imaging lens 12 in the above-mentioned UV image forming optical system which is comprised of the collimating lens 11 and the imaging lens 12. The UV imaging lens is comprised of a first lens group L1 made of a single negative lens element, a second lens group L2 made of a single positive lens element, and a third lens group L3 including five lens elements. The third lens group L3 is comprised of a positive first lens element, a positive second lens element, a positive third lens element, a negative fourth lens element and a positive fifth lens element in the 4th, 6th and 7th embodiments, and a positive first lens element, a positive second lens element, a negative third lens element, a positive fourth lens element and a positive fifth lens element in the 5th embodiment. A diaphragm S is located at a position conjugate with the front focal point of the UV lens. Depending on the stepper, a UV light source, an illuminating light source, a reticle (pattern to be reduced and projected) to be illuminated with the UV radiation, and the collimating lens group are located on the left side of the lens system shown in the drawings; and a wafer (photosensitive medium) on which the reduced image of the reticle is to be projected is located on the right side of the lens system shown in the drawings.

In the following tables and drawings, "NA" designates the numerical aperture, "W" the half angle of view, "$f_B$" the back focal distance, "R" the radius of curvature of each lens surface, "D" the lens thickness or the distance between the lenses, and "N (248 nm)" and "N (266 nm)" the refractive indexes at the wavelengths of 248 nm and 266 nm, respectively Further, for the values listed in each of the Tables 5–8, the lens surfaces and distances are numbered consecutively from the lefthand side to the righthand side in FIGS. 7, 10, 12, and 14, respectively.

Figure 7:
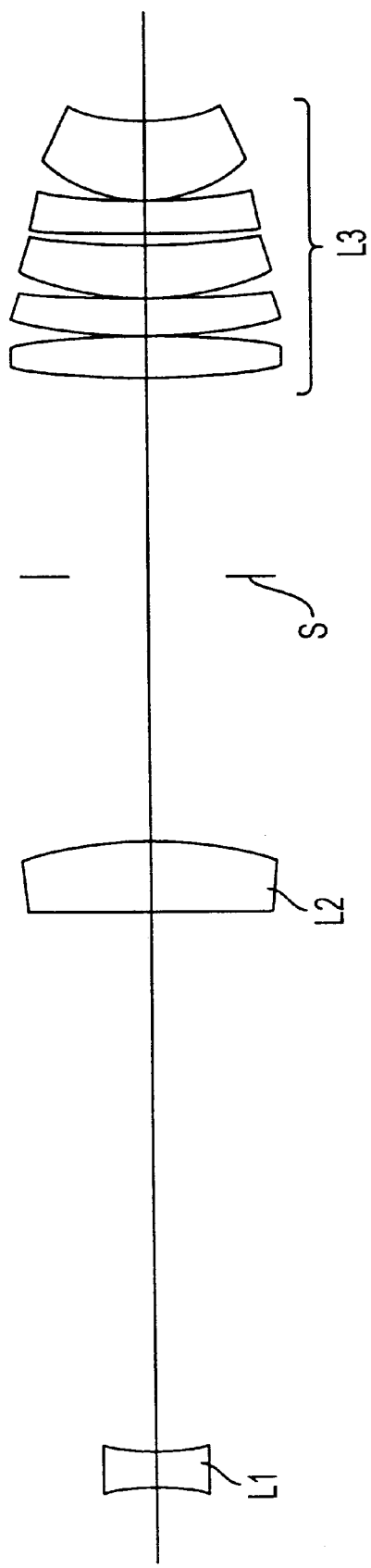
FIG. 7 is a schematic view showing a lens arrangement of a UV lens for a UV image forming optical system, according to a fourth embodiment of the present invention.

4th Embodiment:

The lens arrangement and lens data regarding the fourth embodiment are shown in FIG. 7 and Table 5, respectively, and the aberrations of the lens system are shown in FIG. 8. FIG. 9 shows the aberrations when the distance between the first lens group L1 and the second lens group L2 is changed from 71.450 to 71.650. As can be seen from FIG. 9, there is little variation in the spherical aberration, curvature of field and distortion, but there is a considerable deviation with respect to the sine condition curve.

TABLE 5

NA = 0.40
f = 10.00
W = 4.6°
$f_B$ = 21.14

| Surface No. | R | D | N(248 nm) |
|---|---|---|---|
| 1 | −35.646 | 4.500 | 1.49967 |
| 2 | 24.973 | 71.450 | — |
| 3 | −2898.776 | 9.000 | 1.49967 |
| 4 | −60.593 | 35.220 | — |
| Stop | ∞ | 25.900 | — |
| 5 | 133.332 | 5.500 | 1.49967 |
| 6 | −197.283 | 0.050 | — |
| 7 | 61.364 | 5.000 | 1.49967 |
| 8 | 214.878 | 0.050 | — |
| 9 | 41.388 | 6.980 | 1.49967 |
| 10 | 88.748 | 1.600 | — |
| 11 | 450.597 | 4.300 | 1.49967 |
| 12 | 96.068 | 0.050 | — |
| 13 | 20.123 | 10.500 | 1.49967 |
| 14 | 30.412 | — | — |

Figure 10:
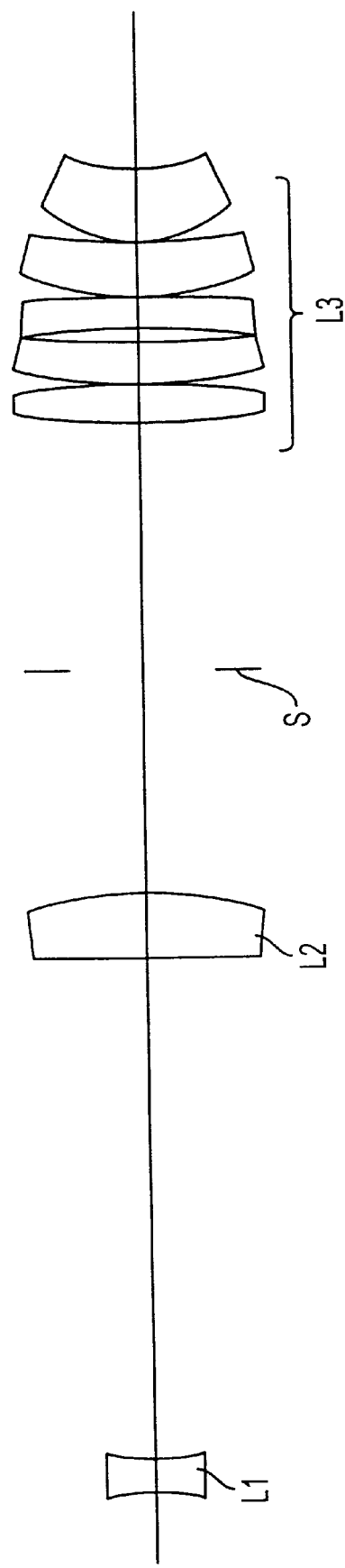
FIG. 10 is a schematic view showing a lens arrangement of a UV lens for a UV image forming optical system, according to a fifth embodiment of the present invention.
Figure 11A:
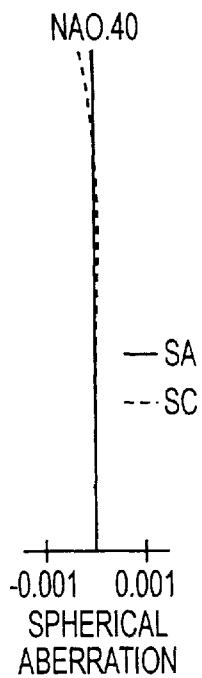
FIG. 11 shows diagrams of aberrations of the lens system shown in FIG. 10.
Figure 11B:
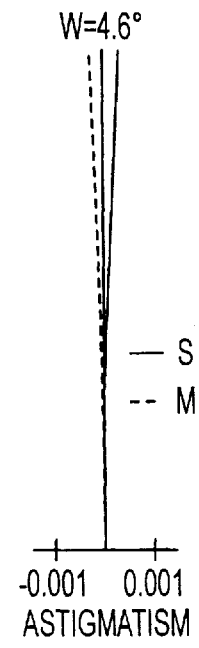
Figure 11C:
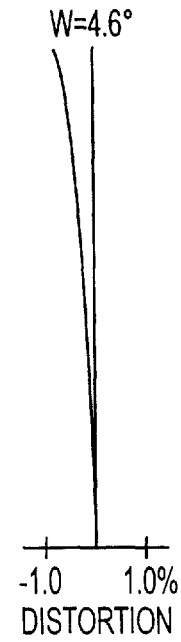

5th Embodiment:

The lens arrangement and numerical data of the optical system of the fifth embodiment are shown in FIG. 10 and Table 6 respectively, and the aberrations of the optical system shown in FIG. 10 are shown in FIG. 11.

TABLE 6

NA = 0.40
f = 10.00
W = 4.6°
$f_B$ = 21.83

| Surface No. | R | D | N(266 nm) |
|---|---|---|---|
| 1 | −33.191 | 4.510 | 1.49967 |
| 2 | 25.614 | 71.510 | — |
| 3 | −11921.599 | 9.720 | 1.49967 |
| 4 | −58.313 | 31.100 | — |
| Stop | ∞ | 35.000 | — |
| 5 | 143.291 | 5.720 | 1.49967 |
| 6 | −159.364 | 0.050 | — |
| 7 | 62.849 | 6.140 | 1.49967 |
| 8 | 234.248 | 1.710 | — |
| 9 | −150.243 | 4.310 | 1.49967 |
| 10 | 562.003 | 0.050 | — |
| 11 | 37.079 | 8.000 | 1.49967 |
| 12 | 81.099 | 0.050 | — |
| 13 | 20.943 | 10.500 | 1.49967 |
| 14 | 31.265 | — | — |

Figure 13A:
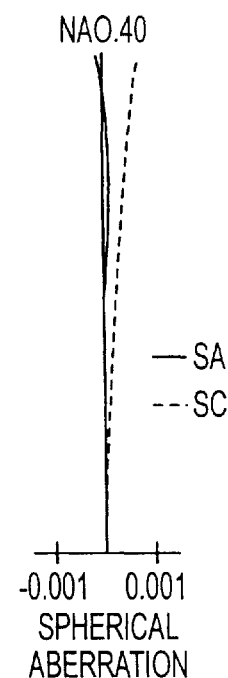
FIG. 13 shows diagrams of aberrations of the lens system shown in FIG. 12.
Figure 13B:
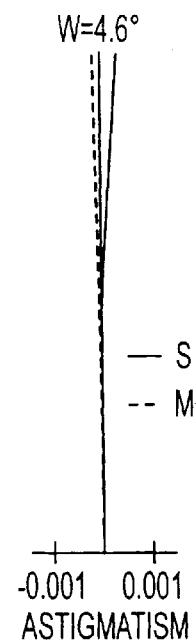
Figure 13C:
Figure 12:
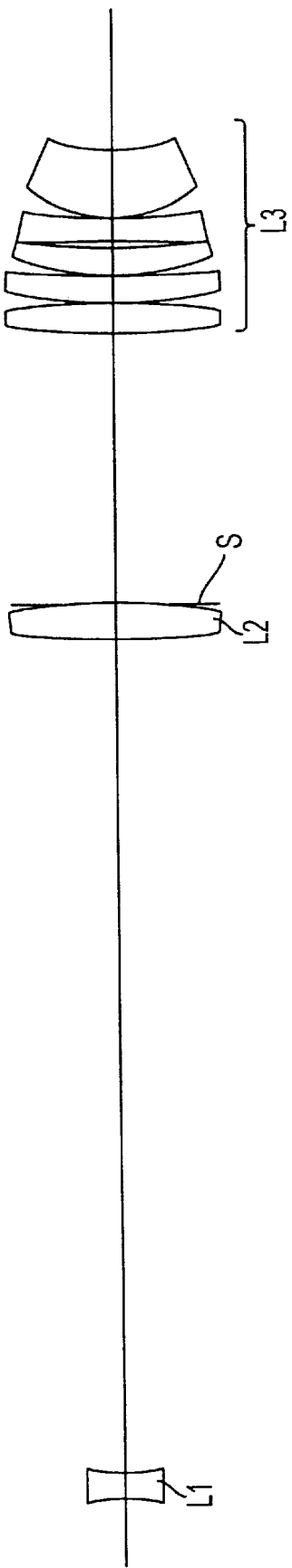
FIG. 12 is a schematic view showing a lens arrangement of a UV lens for a UV image forming optical system, according to a sixth embodiment of the present invention.

6th Embodiment:

The lens arrangement and numerical data of the optical system of the sixth embodiment are shown in FIG. 12 and Table 7 respectively, and the aberrations of the optical system shown in FIG. 12 are shown in FIG. 13.

TABLE 7

NA = 0.40
f = 10.00
W = 4.6°
$f_B$ = 28.83

| Surface No. | R | D | N(248 nm) |
|---|---|---|---|
| 1 | −65.427 | 5.000 | 1.50841 |
| 2 | 34.431 | 180.000 | — |
| 3 | 411.480 | 7.000 | 1.50841 |

TABLE 7-continued

NA = 0.40
f = 10.00
W = 4.6°
$f_B$ = 28.83

| Surface No. | R | D | N(248 nm) |
|---|---|---|---|
| 4 | −159.495 | 0.000 | — |
| Stop | ∞ | 58.260 | — |
| 5 | 153.354 | 6.000 | 1.50841 |
| 6 | −532.041 | 0.080 | — |
| 7 | 71.588 | 6.000 | 1.50841 |
| 8 | 218.181 | 0.080 | — |
| 9 | 55.151 | 6.000 | 1.50841 |
| 10 | 100.751 | 1.600 | — |
| 11 | 382.767 | 4.000 | 1.50841 |
| 12 | 130.227 | 0.080 | — |
| 13 | 27.349 | 14.700 | 1.50841 |
| 14 | 38.836 | — | — |

Figure 14:
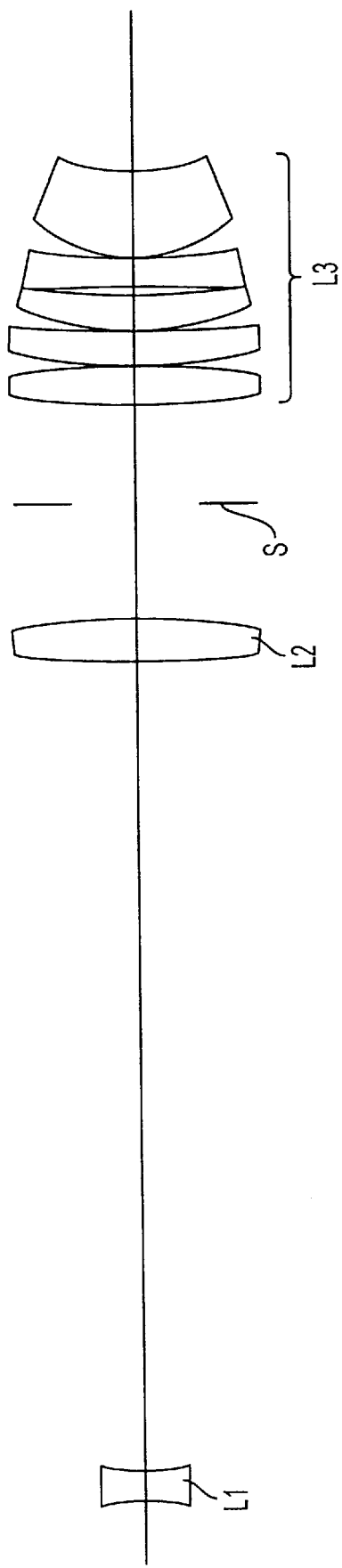
FIG. 14 is a schematic view showing a lens arrangement of a UV lens for a UV image forming optical system, according to a seventh embodiment of the present invention.
Figures 15A, 15B, 15C:
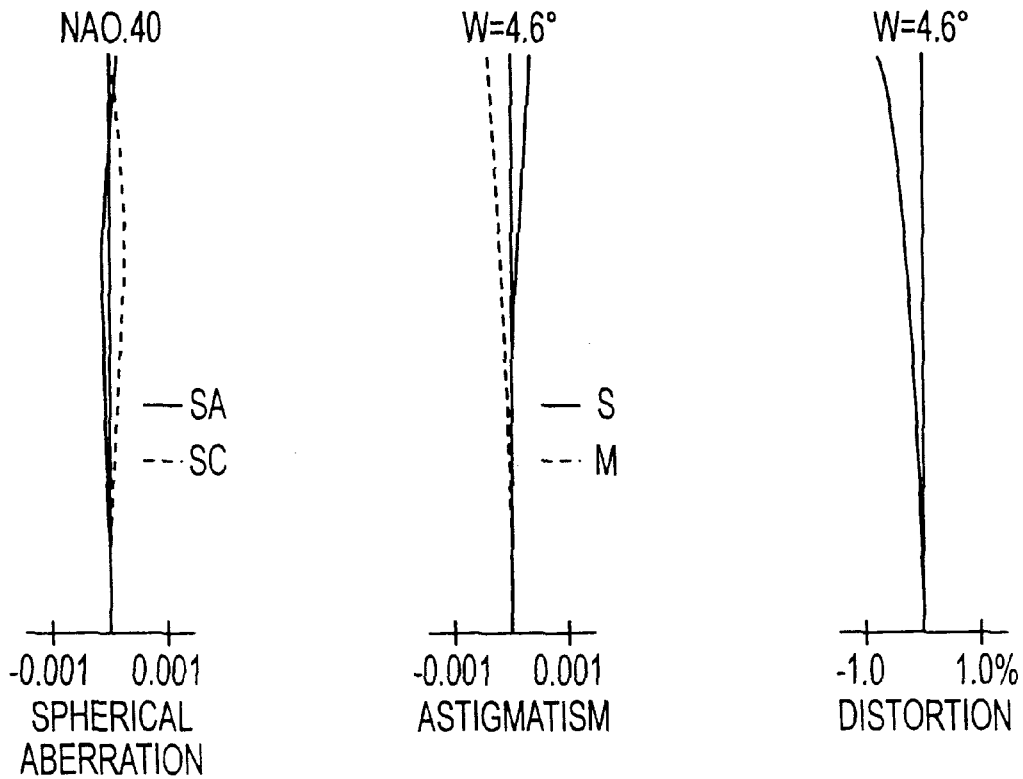
FIG. 15 shows diagrams of aberrations of the lens system shown in FIG. 14.

7th Embodiment:

The lens arrangement and numerical data of the optical system of the seventh embodiment are shown in FIG. 14 and Table 8 respectively, and the aberrations of the optical system shown in FIG. 14 are shown in FIG. 15.

TABLE 8

NA = 0.40
f = 10.01
W = 4.6°
$f_B$ = 26.26

| Surface No | R | D | N(248 nm) |
|---|---|---|---|
| 1 | −49.400 | 5.000 | 1.50841 |
| 2 | 31.809 | 133.900 | — |
| 3 | 392.473 | 7.000 | 1.50841 |
| 4 | −138.921 | 19.040 | — |
| Stop | ∞ | 16.100 | — |
| 5 | 138.039 | 6.000 | 1.50841 |
| 6 | −341.297 | 0.080 | — |
| 7 | 71.289 | 6.000 | 1.50841 |
| 8 | 266.176 | 0.080 | — |
| 9 | 55.080 | 6.000 | 1.50841 |
| 10 | 103.704 | 1.600 | — |
| 11 | 987.249 | 4.000 | 1.50841 |
| 12 | 125.209 | 0.080 | — |
| 13 | 26.717 | 14.700 | 1.50841 |
| 14 | 43.870 | — | — |

Numerical values of the above-noted formulae (4) through (6) corresponding to the four embodiments (4th–7th embodiments) are shown in Table 9 below.

TABLE 9

| | Formula(1) | Formula(2) | Formula(3) |
|---|---|---|---|
| Embodiment 4 | 6.11 | 7.15 | −4.314 |
| Embodiment 5 | 6.61 | 7.15 | −4.156 |
| Embodiment 6 | 5.83 | 18.00 | −5.203 |
| Embodiment 7 | 3.51 | 13.39 | −5.437 |

As can be seen from Table 9, the fourth, fifth, sixth and seventh embodiments meet the requirements defined in the formulae (4) through (6). Moreover, it can be seen from the aberration drawings that the spherical aberration, curvature of field and distortion are effectively compensated in these embodiments As may be understood from the above discussion, a UV lens having a large NA whose aberrations, including curvature of field, are effectively corrected and which has an enhanced diffraction-limited can be obtained.

What is claimed is:

1. A UV image forming optical system, comprising:

a collimating lens which collimates light emitted from a UV light source; and, an imaging lens which forms an image of the collimated UV light transmitted through said collimating lens;

wherein a rear focal point of said collimating lens, adjacent to said imaging lens, is located outside of, and on the light emission side of, said collimating lens;

wherein a front focal point of said imaging lens, adjacent to said collimating lens, is located within said imaging lens;

wherein said rear focal point of said collimating lens coincides with said front focal point of said imaging lens; and wherein a diaphragm is located at said rear focal point of said collimating lens which coincides with said front focal point of said imaging lens.

2. The UV image forming optical system according to claim 1, wherein said optical system satisfies the following relationships:

$$d1/f1 < 1.0$$

$$2.50 < d1/f2$$

$$1.50 < d2/f2 < 5.0$$

wherein, d1 represents the distance between the last lens surface of the collimating lens and the rear focal point adjacent to the imaging lens;

d2 represents the distance between the first lens surface of the imaging lens adjacent to the collimating lens and the front focal point of the imaging lens;

f1 represents the focal length of the collimating lens; and, f2 represents the focal length of the imaging lens.

3. The UV image forming optical system according to claim 1, said imaging lens comprising a negative first lens group, a positive second lens group, and a positive third lens group having at least one negative lens element, arranged in this order from the light incident side, and wherein said optical system satisfies the following relationships:

$$1.0 < d4/f$$

$$6.0 < d2/f < 20.0$$

$$-6.0 < f2/f1 < -3.3$$

wherein, f represents the focal length of said imaging lens;

d4 represents the distance between the second lens group and the third lens group of said imaging lens;

d2 represents the distance between the first lens group and the second lens group of said imaging lens;

f1 represents the focal length of the first lens group of said imaging lens; and f2 represents the focal length of the second lens group of said imaging lens.

4. The UV image forming optical system according to claim 3, said first lens group comprising a single negative lens and said second lens group comprising a single positive lens.

5. The UV image forming optical system according to claim 3, said third lens group comprising a positive lens element, a positive lens element, a positive lens element, a negative lens element, and a positive lens element, in this order from the light incident side.

6. The UV image forming optical system according to claim 3, said third lens group comprising a positive lens element, a positive lens element, a negative lens element, a positive lens element, and a positive lens element, in this order from the light incident side.

7. The UV image forming optical system according to claim 3, further comprising a lens barrel supporting mechanism which supports said first lens group and said second lens group.

8. The UV image forming optical system according to claim 7, further comprising an adjusting mechanism for adjusting a distance between said first lens group and said second lens group.

9. The UV image forming optical system according to claim 3, further comprising a diaphragm located at the front focal point of the image forming lens.

10. A lens system for UV radiation, comprising:
    a negative first lens group;
    a positive second lens group; and
    a positive third lens group having at least one negative lens element, in this order from a light incident side;
    wherein said lens system for UV radiation satisfies the following relationships:

$1.0 < d4/f$ $6.0 < d2/f < 20.0$ $-6.0 < f2/f1 < -3.3$ wherein, f represents the focal length of said lens system;
d4 represents the distance between the second lens group and the third lens group;
d2 represents the distance between the first lens group and the second lens group;
f1 represents the focal length of the first lens group; and,
f2 represents the focal length of the second lens group.

11. The lens system for UV radiation according to claim 10, said first lens group comprising a single negative lens and said second lens group comprising a single positive lens.

12. The lens system for UV radiation according to claim 10, said third lens group comprising a positive lens element, a positive lens element, a positive lens element, a negative lens element, and a positive lens element, in this order from the light incident side.

13. The lens system for UV radiation according to claim 10, said third lens group comprising a positive lens element, a positive lens element, a negative lens element, a positive lens element, and a positive lens element, in this order from the light incident side.

14. The lens system for UV radiation according to claim 10, further comprising a lens barrel supporting mechanism which supports said first lens group and said second lens group.

15. The lens system for UV radiation according to claim 14, further comprising an adjusting mechanism for adjusting a distance between said first lens group and said second lens group upon assembly.

16. The lens system for UV radiation according to claim 10, further comprising a diaphragm that is located at a front focal point of said lens system for UV radiation.

17. The lens system for UV radiation according to claim 10, wherein said lens for UV radiation is adopted to be used at a wavelength below 350 nm.

* * * * *